(12) United States Patent
Pauls et al.

(10) Patent No.: US 9,736,995 B2
(45) Date of Patent: Aug. 22, 2017

(54) CONTROLLED ENVIRONMENT ENCLOSURE WITH BUILT-IN STERILIZATION/PASTEURIZATION FUNCTIONALITY

(71) Applicant: BioChambers Incorporated, Winnipeg (CA)

(72) Inventors: Rob Pauls, Winnipeg (CA); Marc Theroux, Grand Point (CA); Bruce Kettner, Winnipeg (CA)

(73) Assignee: Biochambers Incorporated, Winnipeg, Manitoba (CA)

( * ) Notice: Subject to any disclaimer, the term of this patent is extended or adjusted under 35 U.S.C. 154(b) by 598 days.

(21) Appl. No.: 14/199,234

(22) Filed: Mar. 6, 2014

(65) Prior Publication Data

US 2014/0311025 A1    Oct. 23, 2014

(30) Foreign Application Priority Data

Mar. 8, 2013   (CA) .................................. 2808647

(51) Int. Cl.

| | |
|---|---|
| *F25D 23/12* | (2006.01) |
| *F25D 11/00* | (2006.01) |
| *F24D 5/00* | (2006.01) |
| *A01G 9/14* | (2006.01) |
| *A01G 9/24* | (2006.01) |

(52) U.S. Cl.
CPC   *A01G 9/14* (2013.01); *A01G 9/24* (2013.01)

(58) Field of Classification Search
CPC .................................. A01G 9/14; A01G 9/24
USPC ...... 62/259.2, 440; 237/1 R; 307/39; 700/23
See application file for complete search history.

(56) References Cited

U.S. PATENT DOCUMENTS

| | | | |
|---|---|---|---|
| 976,768 A | 11/1910 | Young | |
| 1,996,708 A | 4/1935 | Parsons | |
| 2,134,098 A | 10/1938 | Babcock | |
| 2,150,257 A | 3/1939 | Winandy | |
| 2,350,721 A | 6/1944 | Brown | |
| 2,784,286 A | 3/1957 | Dillon | |
| 2,988,624 A | 6/1961 | Iseli-Bossardt | |
| 3,136,090 A | 6/1964 | Carnwath | |
| 3,275,836 A * | 9/1966 | Vancha ............... | F02N 11/0803 123/179.3 |
| 3,582,921 A * | 6/1971 | Krieger .................. | G08C 15/04 340/517 |

(Continued)

FOREIGN PATENT DOCUMENTS

GB              696479           9/1953

*Primary Examiner* — Henry Crenshaw
(74) *Attorney, Agent, or Firm* — Kyle R. Satterthwaite; Ryan W. Dupuis; Ade & Company Inc.

(57) ABSTRACT

A controlled environment enclosure features a heating and cooling system and a control system linked to the heating and cooling system for control of same. The control system being operable to switch between an environmental control mode for achieving user-prescribed environmental conditions within the interior space and a sterilization/pasteurization mode for heating contents of the internal space to values within a range sufficiently elevated above the prescribed environmental conditions to sterilize/pasteurize said contents of the internal space. The built-in sterilization/pasteurization function reduces or eliminates the need for personnel to physically wash down the interior space of the enclosure with cleaning chemicals.

8 Claims, 1 Drawing Sheet

(56) References Cited

U.S. PATENT DOCUMENTS

| | | | | |
|---|---|---|---|---|
| 3,641,263 A * | 2/1972 | Rhoads | B65G 47/50 | |
| | | | 186/49 | |
| 3,899,022 A * | 8/1975 | Persson | F24F 3/0442 | |
| | | | 165/217 | |
| 4,165,036 A * | 8/1979 | Meckler | F24F 3/001 | |
| | | | 237/1 R | |
| 5,327,546 A * | 7/1994 | Yokoi | G05B 19/042 | |
| | | | 700/23 | |
| 5,493,808 A * | 2/1996 | Munday | A01G 9/246 | |
| | | | 454/230 | |
| 5,511,434 A * | 4/1996 | Baker | B01L 1/00 | |
| | | | 73/865.6 | |
| 5,874,787 A * | 2/1999 | Meyer | B67D 7/3218 | |
| | | | 222/23 | |
| 6,128,914 A * | 10/2000 | Tamaoki | F25B 9/006 | |
| | | | 312/401 | |
| 6,259,074 B1 * | 7/2001 | Brunner | A61M 5/44 | |
| | | | 219/494 | |
| 6,997,006 B2 * | 2/2006 | Kameyama | F24F 1/022 | |
| | | | 361/688 | |
| 2003/0047949 A1 * | 3/2003 | Brunner | E05B 63/246 | |
| | | | 292/163 | |
| 2003/0058115 A1 * | 3/2003 | Keller | G01K 3/00 | |
| | | | 340/584 | |
| 2003/0220200 A1 * | 11/2003 | Wertz | A01C 1/06 | |
| | | | 504/327 | |
| 2004/0111960 A1 * | 6/2004 | Smullen | A01B 77/00 | |
| | | | 47/1.42 | |
| 2007/0221199 A1 * | 9/2007 | Hake | F24C 15/2021 | |
| | | | 126/299 R | |
| 2007/0242969 A1 * | 10/2007 | Ishii | G03G 15/205 | |
| | | | 399/68 | |
| 2007/0248340 A1 * | 10/2007 | Phillips | F24H 9/2014 | |
| | | | 392/441 | |
| 2008/0245783 A1 * | 10/2008 | Aoyama | A47J 39/006 | |
| | | | 219/448.12 | |
| 2011/0163462 A1 * | 7/2011 | Lang | B01J 19/00 | |
| | | | 260/1 | |

\* cited by examiner

CONTROLLED ENVIRONMENT ENCLOSURE WITH BUILT-IN STERILIZATION/PASTEURIZATION FUNCTIONALITY

CROSS REFERENCE TO RELATED APPLICATIONS

This applications claims benefit under 35 U.S.C. 119(a) of Canadian Patent Application No. 2,808,647, filed Mar. 8, 2013, the entirety of which is incorporated herein by reference.

FIELD OF THE INVENTION

The present invention relates generally to controlled environment chambers and rooms, and more particularly to such enclosures featuring a heating and control systems operable to switch from a normal 'controlled environment' mode of operation to a distinct 'sterilization/pasteurization' mode attaining notably higher temperatures to automatically sterilize or pasteurize interior contents of the chamber or room using heat.

BACKGROUND OF THE INVENTION

Plant growth chambers and rooms are used to support plant and animal science researchers by providing a highly controllable environment in which to conduct experiments. Chambers and rooms manufactured and supplied by the assignee of the present application include temperature and lighting control as standard features, with H2O and CO2 options in both additive and subtractive mode. Typical temperature ranges are from 4 C to 45 C with specialized chambers capable of achieving lower temperatures, down to −10 C with defrosting options.

Existing users have a need to sterilize or pasteurize the interior surfaces of the chambers or rooms as well as materials which are commonly used inside the equipment such as pots and soil. Currently their only options are washing down procedures with chemical solutions such as bleach or running the chamber at the maximum temperature (45 C) for an extended period. Neither method is completely effective. There are too many hidden areas to have complete contact by chemicals and residual effects can be harmful to future experiments. Heating to 45 C even for extended periods of time is insufficient to kill some harmful organisms.

Use of heat to sterilize soil has been employed in the prior art, using steam, a fuel burning furnace, or electrical resistance heaters embedded within the soil to achieve the required temperatures for sterilization. Examples of prior art soil sterilization devices include those disclosed in U.S. Pat. Nos. 976,768, 1,996,708, 2,134,098, 2,150,257, 2,350,721, 2,784,286, 2,988,624, 3,136,090 and U.K. Patent 696479.

However, none of foregoing references disclose a growth enclosure incorporating built in sterilization functionality into its environmental control system.

U.S. Patent Application Publication assigned to Highres Biosolutions discloses a self-sterilizing automated incubator for cell-culture sample plates that incorporates a built-in sterilization function. However, the reference lacks any safety mechanisms for preventing inadvertent exposure of personnel to the dangerously elevated temperatures of the sterilization mode, and provides no detail on how to accomplish the proposed sterilization temperatures, indicating only the inclusion of a vaguely referenced "heating system" operable to force air into the incubator to achieve dry heat sterilization at temperatures of 130° C. to 180° C. As a cell-culture incubator, the disclosed invention is not suitably equipped for use as a plant growth chamber, for example lacking internal lighting that is automatically controlled to provide prescribed lighting conditions for growth of plant life within the unit.

Accordingly, there remains room for improvement and development in the field of controlled environment enclosures.

SUMMARY OF THE INVENTION

According to a first aspect of the invention there is provided a controlled environment enclosure comprising:

a structure comprising an interior space bound by a floor, a ceiling, walls spanning between said floor and ceiling, an access way opening into said interior space from outside the enclosure, and an access door movable between open and closed positions at said access way to respectively open and close access to said interior space;

a heating and cooling system;

a control system linked to the heating and cooling system for control of same, the control system being operable to switch between an environmental control mode for achieving user-prescribed environmental conditions within the interior space and a sterilization/pasteurization mode for heating contents of the internal space to values within a range sufficiently elevated above the prescribed environmental conditions to sterilize/pasteurize said contents of the internal space.

Preferably the heating and cooling system comprises a first system and a different second system, the control system being arranged to operate the first system in the environmental control mode and operate the second heating system in the sterilization/pasteurization mode. In one embodiment, the first system is a refrigeration system and the second system is an electric heating system.

Preferably the controller is arranged to operate the refrigeration system to perform a heating cycle in the sterilization/pasteurization mode.

Preferably the controller is arranged to operate only the second system of the heating and cooling system in the sterilization/pasteurization mode.

Preferably the controller is arranged to operate the second system of the heating and cooling system only in the sterilization/pasteurization mode.

In other embodiments, the control system may perform the heating cycle of the refrigeration system in the sterilization/pasteurization mode and augment said heating cycle with said electric heating system in the sterilization/pasteurization mode. However, such embodiments may be less preferred, due to potential risks or complications in running the refrigeration system at the elevated temperatures of the sterilization/pasteurization mode.

Preferably the electric heating system comprises an electric air heating system.

Preferably the electric heating system comprises electric heating elements disposed within an airflow path of the refrigeration system.

Preferably the heating and cooling system and the control system are arranged to allowing selective raising of a temperature of the interior space to at least 40-degrees Celsius in the environmental control mode.

Preferably the heating and cooling system and the control system are arranged to raise a temperature of the interior space to at least 50 degrees Celsius in the sterilization/ pasteurization mode. Some embodiments may be configured to achieve 60 C or higher in the sterilization/pasteurization mode.

Preferably the heating and cooling system and the control system are arranged to achieve a maximum temperature in the sterilization/pasteurization mode that that does not exceed 100 degrees Celsius.

Preferably there is provided a lock operable to secure the door in the closed position, wherein the control system is arranged to automatically engage the lock in order to automatically secure the door in the closed position during the sterilization/pasteurization mode.

Preferably the control system is arranged to automatically lock the door upon detecting a predetermined temperature value within the interior space.

Preferably an interior kill switch operable from inside the interior space to disengage the lock to release the door and allow movement thereof from the closed position to the open position.

Preferably the interior kill switch is arranged to terminate a heating process of the heating and cooling system upon actuation of the interior kill switch.

Preferably there is provided an exterior kill switch operable outside the interior space to terminate a heating process of the heating and cooling system upon actuation of the exterior kill switch.

The exterior kill switch may be arranged to maintain an engaged state of the lock in order to keep the door secured in the closed position until an interior air temperature is below a predetermined safe level, for example of 45 C, when said switch is actuated to terminate the heating process.

Preferably there is provided a mechanical thermal safety switch configured to, independently of the controller, terminate heating of the internal space by the heating and cooling system upon reaching of a predetermined temperature limit in the interior space.

Preferably there is provided at least one safety temperature sensor positioned within the interior space and arranged to terminate, via the controller, heating of the internal space by the heating and cooling system upon reaching of a predetermined temperature limit in the interior space.

Preferably the controlled environment enclosure is a plant growth chamber comprising one or more light sources within the interior space that are connected to the control system for controlling lighting conditions within the interior space.

Preferably the at least one safety temperature sensor is mounted proximate the one or more light sources.

Preferably there is provided a warning system arranged for actuation by the control system in response to initialization of the sterilizing/pasteurizing mode to warn personnel of initiation of same.

The warning system may comprise an audible warning device.

The warning system may comprise a visual warning device.

Preferably there is provided a damper linked to the control system for automatic movement of the damper between open and closed positions that respectively allow and prevent airflow between the interior space of the enclosure and an exterior thereof.

The control system is preferably arranged to automatically close the damper for the pasteurization/sterilization mode and automatically open the damper after completion of a pasteurization/sterilization process performed in said pasteurization/sterilization mode to enable faster cooling of the interior space.

The control system may be configured to automatically run the heating and cooling system in a cooling mode after completion of a pasteurization/sterilization process performed in the pasteurization/sterilization mode to enable faster cooling of the interior space.

According to a second aspect of the invention there is provided a controlled environment enclosure comprising:

a structure comprising an interior space bound by a floor, a ceiling, walls spanning between said floor and ceiling, an access way opening into said interior space from outside the enclosure, and an access door movable between open and closed positions at said access way to respectively open and close access to said interior space;

a heating and cooling system; and a control system linked to the heating and cooling system for control of said heating and cooling system, the control system being operable to switch between an environmental control mode for achieving user-prescribed environmental conditions within the interior space and a sterilization/pasteurization mode for heating contents of the internal space to an elevated temperature level that exceeds the prescribed environmental conditions and sterilizes/pasteurizes said contents;

wherein the heating and cooling system comprises a first system and a different second system, the control system being arranged to operate the first system to control an air temperature of the internal space in the environmental control mode and operate a heating function of the different second system in the sterilization/pasteurization mode to increase the air temperature of the internal space and thereby achieve the elevated temperature level of the contents of said internal space.

According to a third aspect of the invention there is provided a controlled environment enclosure comprising:

a structure comprising an interior space bound by a floor, a ceiling, walls spanning between said floor and ceiling, an access way opening into said interior space from outside the enclosure;

a heating and cooling system;

a control system linked to the heating and cooling system for control of said heating and cooling system, the control system being operable to switch between an environmental control mode for achieving user-prescribed environmental conditions within the interior space and a sterilization/pasteurization mode for heating contents of the internal space to an elevated level that exceeds the prescribed environmental conditions and sterilizes/pasteurizes said contents; and a personnel safety system linked to the control system and arranged to initiate at least one personnel protection action upon receipt of an activation signal from the control system;

wherein the control system is arranged to send the activation signal to the personnel safety system in response to an event indicative that the sterilization/pasteurization mode has been initiated.

Preferably the personnel safety system comprises a lock actuable by the activation signal to secure a door of the enclosure in the closed position.

Preferably the personnel safety system comprises a warning system actuable by the activation signal to warn personnel of that the sterilization/pasteurization mode has been initiated.

The control system may be arranged to send the activation signal upon detecting a predetermined temperature value within the interior space that is indicative that the sterilization/pasteurization mode has been initiated.

Alternatively, the control system may be arranged to send the activation signal to the personnel safety system in response to initialization of the sterilization/pasteurization mode.

According to a fourth aspect of the invention there is provided a controlled environment enclosure comprising:

a structure comprising an interior space bound by a floor, a ceiling, walls spanning between said floor and ceiling, an access way opening into said interior space from outside the enclosure, and an access door movable between open and closed positions at said access way to respectively open and close access to said interior space;

a heating and cooling system;

a control system linked to the heating and cooling system for control of said heating and cooling system, the control system being operable to switch between an environmental control mode for achieving user-prescribed environmental conditions within the interior space and a sterilization/pasteurization mode for heating contents of the internal space to an elevated level that exceeds the prescribed environmental conditions and sterilizes/pasteurizes said contents; and a lock operable to secure the door in the closed position, wherein the control system is arranged to automatically engage the lock in order to automatically secure the door in the closed position during the sterilization/pasteurization mode.

According to a fifth aspect of the invention there is provided a controlled environment enclosure comprising:

a structure comprising an interior space bound by a floor, a ceiling, walls spanning between said floor and ceiling, an access way opening into said interior space from outside the enclosure, and an access door movable between open and closed positions at said access way to respectively open and close access to said interior space;

a heating and cooling system;

a control system linked to the heating and cooling system for control of said heating and cooling system, the control system being operable to switch between an environmental control mode for achieving user-prescribed environmental conditions within the interior space and a sterilization/pasteurization mode for heating contents of the internal space to an elevated level that exceeds the prescribed environmental conditions and sterilizes/pasteurizes said contents; and a lock operable to secure the door in the closed position, and wherein the control system is arranged to automatically lock the door upon detecting a predetermined temperature value within the interior space.

According to a sixth aspect of the invention there is provided a controlled environment enclosure comprising:

a structure comprising an interior space bound by a floor, a ceiling, walls spanning between said floor and ceiling, an access way opening into said interior space from outside the enclosure, and an access door movable between open and closed positions at said access way to respectively open and close access to said interior space;

a heating and cooling system;

a control system linked to the heating and cooling system for control of said heating and cooling system, the control system being operable to switch between an environmental control mode for achieving user-prescribed environmental conditions within the interior space and a sterilization/pasteurization mode for heating contents of the internal space to an elevated level that exceeds the prescribed environmental conditions and sterilizes/pasteurizes said contents; and a warning system arranged for actuation by the control system in response to initialization of the sterilizing/pasteurizing mode to warn personnel of initiation thereof.

According to a seventh aspect of the invention there is provided a controlled environment enclosure comprising:

a structure comprising an interior space bound by a floor, a ceiling, walls spanning between said floor and ceiling, an access way opening into said interior space from outside the enclosure, and an access door movable between open and closed positions at said access way to respectively open and close access to said interior space;

a heating and cooling system;

a control system linked to the heating and cooling system for control of same, the control system being operable to switch between an environmental control mode for achieving user-prescribed environmental conditions within the interior space and a sterilization/pasteurization mode for heating contents of the interior space to values within a range sufficiently elevated above the prescribed environmental conditions to sterilize/pasteurize said contents of the interior space; and a damper linked to the control system for automatic movement of the damper between open and closed positions that respectively allow and prevent airflow between the interior space of the enclosure and an exterior thereof;

wherein the control system is arranged to automatically close the damper for the pasteurization/sterilization mode and automatically open the damper after completion of a pasteurization/sterilization process performed in said pasteurization/sterilization mode to enable faster cooling of the interior space.

According to an eighth aspect of the invention there is provided a method of sterilizing/pasteurizing contents of a controlled environment enclosure comprising an interior space and a heating and cooling system operable in an environmental control mode for achieving prescribed environmental conditions within the interior space, the method comprising using a same control system that operates the heating and cooling system in the environmental control mode to switch to a sterilizing/pasteurizing mode in which contents of the internal space to values within a range sufficiently elevated above the prescribed environmental conditions to sterilize/pasteurize said contents of the internal space.

BRIEF DESCRIPTION OF THE DRAWINGS

In the accompanying drawings, which illustrate exemplary embodiments of the present invention.

DETAILED DESCRIPTION

Figure 1:
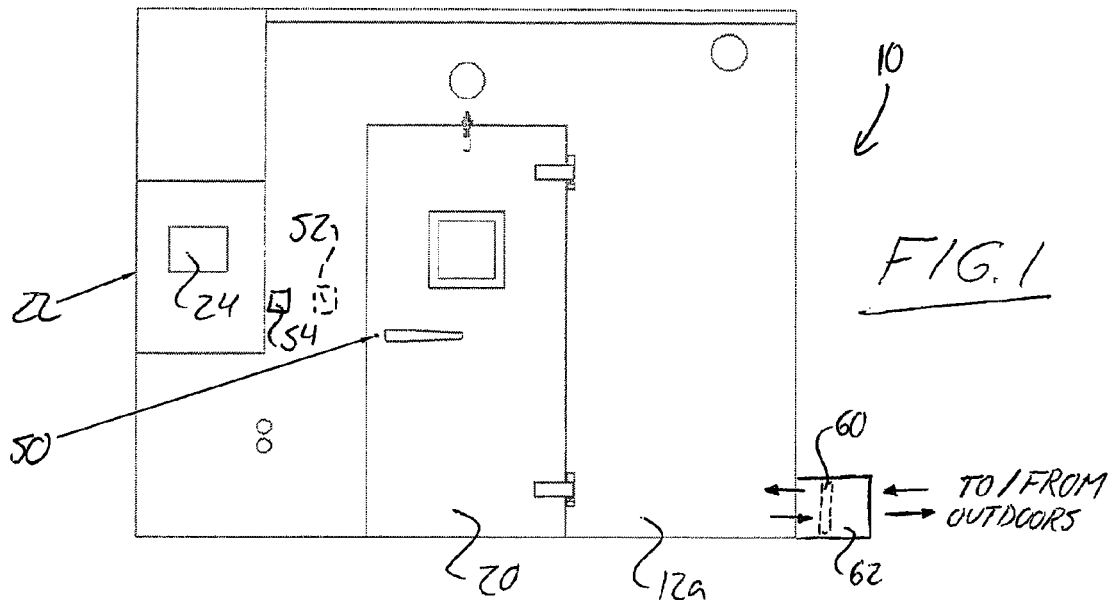
FIG. 1 is an exterior elevational view of a controlled environment chamber/room of the present invention that includes built-in sterilization/pasteurization functionality for sterilization/pasteurizing interior contents of the chamber.

FIG. 1 shows the exterior of a controlled environment chamber or room 10 of the present invention featuring four vertically upright walls 12a, 12b, 12c, 12d spanning upward from a horizontal floor area 14 of the chamber/room to an opposing horizontal ceiling 16 thereof that spans over the area between all four of the walls. While described in terms of a rectangular interior space 18 bound by four walls and parallel rectangular floor and ceiling areas, a chamber or room of the present invention is not limited to such a particular shape or configuration.

At least one wall features a door 20 mounted thereon to normally reside in a closed position that seals closed a doorway that serves as the main access point to the interior space of the chamber or room. In a conventional manner, the door is hinged or otherwise movably mounted to the wall for selective opening of the door to reveal the doorway and enable access by personnel to and from the interior space. With the door closed, the chamber or room interior is sealed off from the space outside the chamber or room. It will be appreciated that where the structure is a stand-alone chamber housed in a room of a building, the surrounding space is the room in which the chamber resides, while if the structure is a built-into a larger overall building structure, the outside space may be considered an adjoining room or hallway. Depending on the size of the interior space, the access door may refer to large enough door for users to walk into the room or chamber, or may refer to a smaller access door for manual insertion and removal of objections in a smaller chamber that is not walk-in accessible. A control box 22 is mounted to a respective wall of the room or chamber 10 to present an outward facing control panel 24 at the exterior of the chamber or room for presenting a user-interface of the control box for manipulation by a user to operate environmental control functionality of the chamber or room.

Figure 2:
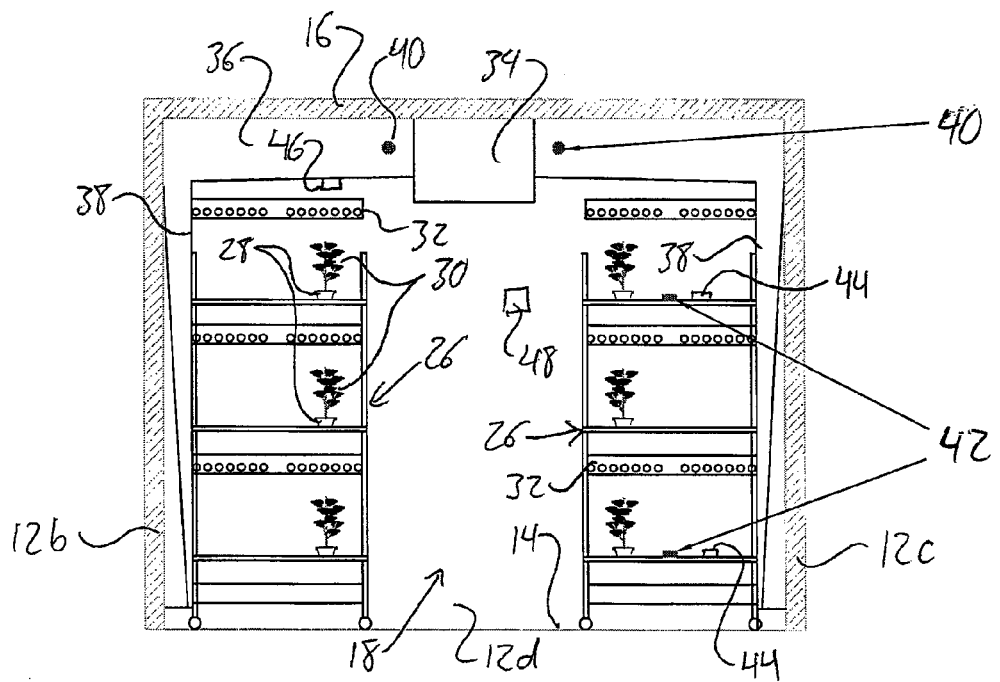
FIG. 2 is a cross-sectional view of the controlled environment chamber/room of FIG. 1 in a vertical plane.

Turning to FIG. 2, the interior space may contain shelving units 26 therein for supporting beds or pots 28 of soil for growth of plant life 30 therein within the controlled environmental conditions of the interior space of the room or chamber. One or more light sources, for example one or more banks of lamps 32 each containing a plurality of lamp bulbs are provided, for example in the illustrated form of one respective lamp bank for each shelf. In the illustrated embodiment, a main duct 34 runs lengthwise along the ceiling 16 at a central location thereacross to provide a delivery conduit for conditioned air from a refrigeration system (not shown) that is used to control the interior temperature of the room or chamber according to user-defined conditions based on the plant-life or experimental requirements, which are entered via the control panel 24. Air is conveyed laterally outward from the main duct 34 toward opposing walls 12b, 12c of the room or chamber through suitable passages 36 at the ceiling 16. Pressurization baffles 38 on the interior of the walls 12b, 12c receive downward flowing air from the passages 36, where the air continues into the interior space of the chamber or room through perforations in the baffles, which are positioned so as to aid in uniform distribution of the air to the interior space. It will be appreciated that this sidewall airflow arrangement is just one example of a possible airflow configuration for a controlled environment chamber or room, and other airflow arrangements and combinations may be employed, including use of upward or downward airflows into the interior space, with or without plenums.

The forgoing configuration of the basic chamber or room structure is in accordance with known convention in the field of control environment enclosures, and may be notably varied while maintaining the same general configuration of an interior space for containing plant life or other growth and providing a high degree of tight control over conditions of the interior environment of the enclosure. The controlled conditions typically include at least temperature, lighting conditions, and humidity. Refrigeration systems configured to provide both refrigeration cooling cycles and hot-air heating cycles in order to enable raising and lowering of the internal temperature of the enclosure for tight control thereof are well known in the art, and thus not described herein in detail, as are electronic control means for receiving user-input to define parameters such as the temperature, lighting, and humidity conditions to be maintained, and to control lighting and heating/cooling/conditioning systems according to such parameters.

The illustrated embodiment differs from the prior art in the addition of electric heaters 40 in the air stream entering the interior space from the refrigeration system to attain elevated air temperatures beyond those achievable through the refrigeration system alone for the purpose of heat-based sterilization and/or pasteurization of contents of the chamber or room. The control system is accordingly updated with temperature sensors to achieve and maintain desired temperatures both in the conventional normal 'controlled environment' mode of operation for performing the desired experimentation under controlled conditions, and in the new 'pasteurization/sterilization' mode of operation. As the sterilization/pasteurization process requires elevated temperatures beyond those typically attainable by conventional controlled environment enclosures, the illustrated embodiment also adds safety measures to guard against overheating of the enclosure to dangerous levels, and to prevent people from opening doors when chamber or room is above safe limits, unless someone is actually inside the enclosure under such conditions, for which emergency shutdown and exit solutions are provided.

The control panel 24 provides users with the ability to switch between the 'controlled environment' mode, in which the chamber or room operates in the same manner as a conventional controlled environment enclosure to achieve and maintain each of the user-prescribed conditions within a tight range of the user-entered values, and the 'pasteurization/sterilization' mode, where the temperature is raised above the available range of temperatures for the controlled environment' mode.

Temperature control in the 'controlled environment' mode is done through the conventional refrigeration system which uses hot gas from heat of compression when it is necessary to increase the temperature, and a standard refrigeration cooling cycle when a temperature reduction is needed. The air temperature attainable through the hot-gas heating cycle has a practical limit of about 40 C, so when higher temperatures are needed for the 'pasteurization/sterilization' mode, the electric heaters 40 are operated and the refrigeration system is deactivated. In some embodiments, the electric heaters may also be used in a supplemental manner in the 'controlled environment' mode to allow attainment of air temperatures up to about 45 C. In switching from the 'controlled environment mode' to the 'pasteurization/sterilization' mode, the heating load is thus handed off from the refrigeration system, or from a combination of the refrigeration system and electric heaters, to the electric heaters alone. In the illustrated embodiment, these electric heaters 40 are placed within the airflow at locations inward from the outer shell of the overall chamber or room so as to add heat to the incoming air from the refrigeration system relatively close to the final points at which the air enters the open interior space of the enclosure, thereby minimizing the opportunity for loss of the heat added by the electric heaters to the exterior of the structure and surrounding or adjoining environment. The illustrated embodiment employs a ducted pathway from the evaporators of the refrigeration system, and the schematically illustrated supplementary heaters 40 are placed in the lateral duct passages 36 to reside downstream of the evaporators. Other embodiments without ducted airways after the evaporators may employ placement of the supplementary heaters 40 upstream from the location of the evaporators of the refrigeration system.

One or more temperature sensors 42 are located within the interior and measure the internal air temperature of the chamber or room during the 'controlled environment' mode in a conventional manner, and similarly now measure the internal temperature during the new 'pasteurization/sterilization' mode, and relay the measured signal to the controller at the control box 22 for use in controlling the refrigeration system and electric heaters.

The temperature measurements may include measurements of one or both of air temperatures and surface temperatures. The goal is to determine that a critical surface (e.g. wall) or volume/body (e.g. center of a soil mass in a pot) has reached a pasteurization/sterilization temperature and retained this temperature for a determined "soak" time, and therefore at least one "surface" or "body" temperature determination is required. One embodiment may employ a sensor that is encapsulated in a thermally insulative material that simulates a "typical" thermal mass to avoid problems with finding a good sensor placement location that may other be dependent on the contents of the chamber or room. At the same time, safeguards against air temperatures exceeding safe limits during the "rise and soak" period may be provided by an additional air temperature sensor, which may be the same sensor used for controlling the air temperature in the controlled environment mode.

In another embodiment, instead of separate sensors for air temperature and surface or body temperature, use of an air temperature sensor alone may be sufficient based on experimental determination of suitable air temperature levels determined to guarantee suitable surface or body temperatures for expected room or chamber contents.

In addition to these main temperature sensors used to control the automatic temperature adjustment of the system according to the user-prescribed conditions, the illustrated embodiment includes three other sensors to protect the system from damaging the plants if the system goes out of control due to some sort of failure, especially since the additional heat of the supplementary electric heaters can result in dramatically higher temperatures in the chamber than attainable in conventional units.

Firstly, a respective temperature limit sensor 44 is essentially a redundant temperature sensor placed or mounted next to each main temperature sensor 42 and is used by software of the controller to shut down the chamber if it detects temperatures outside of an acceptable bandwidth (for example, terminating any heating or cooling operation being run by the refrigeration or electrical heating systems, and prevent any such further operation until the system is checked and reset). Secondly, a safety temperature sensor 46, for example mounted on the ceiling 16, near the ceiling-mounted or ceiling adjacent lights, is also used by software to shut down the chamber if it exceeds a predetermined temperature limit. Mounting of this sensor near the lights is intended to account for heat generated by the lights in the temperatures measurements taken by the sensor, but it will be appreciated that the sensor may be positioned elsewhere in other embodiments. Thirdly, a mechanical thermal disc switch 48 shuts down chamber independently of the controller if temperature exceeds a higher limit, thereby providing a fail-safe protecting against the potential of a malfunctioning controller that is no longer providing the appropriate shut-down procedure based on signals from the electronic sensors 42, 44, 46.

The controller may be configured to change the predetermined level at which the limit sensor and safety sensor will trigger shutdown of the heating systems according to whether the controller is currently running in the 'controlled environment' mode or 'pasteurization/sterilization' mode. This way, shut down is triggered at lower temperatures in the 'controlled environment' mode of operation than in the 'pasteurization/sterilization' mode, where higher temperatures are required. This way, if a fault of some kind causes the electric heaters 40 to activate during the 'controlled environment' mode of operation, raising the temperature above the controlled range applied according to the user's input when setting the conditions for the current run of the 'controlled environment' mode of operation, the system will shut down well before sterilization/pasteurization temperatures levels are reached. As is known in the art, the shut-down limit during 'controlled environment' mode will automatically vary according to the user-prescribed experiment conditions entered into the controller.

An electronic lock 50 on the door adds another level of safety in view of the higher than normal temperatures achieved during the sterilization/pasteurization process. When the main temperature sensors detect an internal air temperature above a predetermined value, for example a value above a maximum limit that users can prescribe for the 'controlled environment' mode of operation', the controller automatically sends a lock signal to the electronic lock, causing the same to engage into a locked condition securing the door closed. Until the sterilization/pasteurization process is complete (or canceled via the control panel), and preferably until the detected internal air temperature has been determined to fall below an acceptable level (which may be the same or lower than the auto-lock temperature), the door may only be unlockable by way of an internal kill switch 52 mounted inside the interior space of the enclosure, which will not only unlock the door, but preferably also immediately terminate any heating process that has been initiated. This way, if the 'pasteurization/sterilization' process is inadvertently initiated while someone is inside the enclosure, the person can press the internal kill switch to unlock the door and escape the rising heat. As shown, the internal kill switch may be mounted proximate the door 20, for example on the same wall 12a of the chamber or room as the door.

A warning buzzer or light, or combination thereof, may be included to audibly and/or visually alert people that the pasteurization/sterilization process has been initiated. The warning should be audibly and/or visually noticeable within the interior of the chamber or room, for example by warning devices mounted inside the same, and may also include exterior warning means separately noticeable outside the room or chamber. The operation of the warning device(s) may be tied to the automatic locking function of the enclosure in order to perform simultaneous, concurrent or sequential locking of the door and activation of the warning.

An external kill switch 54 is also provided to allow termination of the heating process from outside the room or chamber. The external kill switch may be configured not to unlock the door if the door has already been automatically locked under the rising temperature of the interior space, thereby preventing someone from inadvertently entering the interior space while at potentially unsafe temperatures, although an emergency override operated separately from the kill-switch actuator may be provided in order to release the door lock in case of emergency. In other embodiments, the external kill switch itself may instead be configured to unlock the door, for example giving someone outside the enclosure the ability to open the door for someone who is inside the enclosure after initiation of the 'pasteurization/ sterilization' mode, but who hasn't realized it or is unable to reach the internal kill switch for some reason.

The controller and heating systems are preferably configured to achieve and maintain an internal air temperature of at least 50 degrees Celsius during the 'pasteurization/sterilization' mode, and more preferably at least 60 degrees Celsius, but for example below a maximum of 100 degrees Celsius. The time required for proper pasteurization or sterilization may vary according to the attained and maintained temperature. For example, 12-24 hours may be required for effectiveness at 50 degrees Celsius, while as little as 30 minutes may be sufficient at 60 degrees Celsius. While some embodiments may employ a pre-programmed timer, other embodiments employ a user-programmable or user-adjustable timer, with the manufacturer providing recommended timer settings for the user. The timer will begin after the "rise and soak" temperature sensor(s) has/have reached setpoint. The system may be configured to automatically the lock the door at a detected temperature above a predetermined value, for example above 45 degrees Celsius.

Using air heaters directly exposed to the air inside or entering the internal space maintains user-flexibility in terms of contents placed inside the chamber or room compared to other possibilities such as electrical resistance heaters or steam pipes in the mounted in dedicated plant beds. In addition, solutions in which heating elements are embedded within soil may be effective to sterilize or pasteurize the soil, but fail to sterilize other objects or materials within the enclosure, such as the wall or shelve surfaces. Also, use of steam as a heating medium may leave behind unwanted humidity in the chamber, creating extra taxation on the system to attain suitable humidity levels prescribed by a particular experiment or test to be conducted in the chamber.

Controlling both modes of operation through a common controller to avoid independent operation prevents undesirable consequences. For example, one cannot inadvertently initiate a 'controlled environment' cycle via a dedicated controller for the refrigeration system while failing to realize that the electric heaters are running, whereby the refrigeration system would be heavily taxed under its attempt to cool down the interior space against the heating process being carried out by the electric heaters. However, embodiments employing separate controllers for the two different modes are not excluded from the scope of the present invention.

A motorized damper, schematically illustrated at 60, may be mounted in an air exchange passage 62 that communicates the interior space of the chamber or room with an exterior thereof. Such passages with manual dampers have been employed in the prior art to provide a controllable amount of air exchange between the interior and exterior of a controlled environment chamber or room, for example to allow introduction of fresh air into the interior space. The electric motor of the damper is connected to the controller for automatic movement of the damper between open and closed positions that respectively allow and prevent airflow between the interior and exterior of the chamber. The controller automatically closes the damper upon initiation of the pasteurization/sterilization mode, thereby trapping the current volume of air inside the chamber to minimize the amount of time for the interior to reach suitable temperatures. When closed, the damper prevents loss of heated interior air to the exterior and entrance of ambient exterior air to the interior.

In addition, or as an alternative, to use of a damper to reduce the cooling time of the interior space, the refrigeration system may be operable to cool down the interior air of the room or chamber. Accordingly, the controller may be configured to automatically run the refrigeration system in a cooling mode operation upon expiry of a timed pasteurization/sterilization process, much like the controller would automatically open the damper at such time in damper-equipped embodiments.

When the soak time of the pasteurization/sterilization process has expired, the motorized damper is automatically opened to enable faster cooling of the interior space by venting the heated interior air from the interior to the exterior. The controller preferably opens the damper before automatically unlocking the door, as the opening of the damper speeds up the cooling of the interior space to the safe level at which the door is unlocked. Accordingly, the air exchange passage 62 preferably connects the interior space to an outdoor environment to avoid potential hazards or complications with venting of hot air from the interior space into an indoor environment.

Suitable electronic controllers for monitoring and controlling conditions based on sensor signals and control panel commands from operating personnel are well known in the art, and may be programmed or configured using known techniques to perform the operations described herein above.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A controlled environment enclosure comprising:
 a structure comprising an interior space bound by a floor, a ceiling, walls spanning between said floor and ceiling, an access way opening into said interior space from outside the enclosure, and an access door movable between open and closed positions at said access way to respectively open and close access to said interior space;
 a heating and cooling system; and
 a control system linked to the heating and cooling system for control of said heating and cooling system, the control system being operable to switch between a user customizable environmental control mode for achieving user-prescribed environmental conditions within the interior space and a pre-programmed user-selectable sterilization mode separate and independent of said user-customizable environmental control mode and pre-configured to employ temperature values exceeding those attainable in the user-customizable environmental control mode to heat the internal space to an elevated temperature level that exceeds the user-prescribed environmental conditions and sterilizes surfaces of said structure within the interior space;
 wherein the heating and cooling system comprises a refrigeration system operable to run a cooling cycle to cool the interior space and a heating cycle using hot gas from compression to heat said interior space, and an electric air heating system operable to perform only heating of said interior space, the control system being arranged to operate the heating and cooling cycles of the refrigeration system as needed to control an air temperature of the internal space according to the user-prescribed environmental conditions in the environmental control mode, without operation of said electric air heating system, and operate the electric air heating system, without the refrigeration system, in the sterilization mode to increase the air temperature of the internal space to an elevated level unattainable by the heating cycle of said refrigeration system and sufficient to sterilize said surfaces within the interior space.

2. The controlled environment enclosure of claim 1 wherein the electric air heating system comprises electric heating elements disposed within an airflow path of the first system that communicates with the interior space of the enclosure.

3. The controlled environment enclosure of claim 1 wherein the heating and cooling system and the control system are arranged to achieve a temperature of at least 50 degrees Celsius in the interior space during the sterilization mode.

4. The controlled environment enclosure of claim 1 comprising a damper linked to the control system for automatic movement of the damper between open and closed positions that respectively allow and prevent airflow between the interior space of the enclosure and an exterior thereof, wherein the control system is arranged to automatically close the damper for the sterilization mode and automatically open the damper in response to expiry of a sterilization process performed in said sterilization mode to enable faster cooling of the interior space.

5. The control system of claim 1 wherein the control system is configured to automatically run the cooling cycle of the refrigeration system in response to expiry of a sterilization process performed in the sterilization mode to enable faster cooling of the interior space.

6. The controlled environment enclosure of claim 3 wherein the elevated temperature level is at least 60 degrees Celsius.

7. The controlled environment enclosure of claim 1 wherein said surfaces of the structure within said interior space include wall surfaces of said structure.

8. The controlled environment enclosure of claim 1 wherein said surfaces of the structure within said interior space include shelve surfaces.

* * * * *